(12) United States Patent
Pizlo et al.

(10) Patent No.: US 8,224,065 B2
(45) Date of Patent: Jul. 17, 2012

(54) RECONSTRUCTION OF SHAPES OF OBJECTS FROM IMAGES

(75) Inventors: Zygmunt Pizlo, Indianapolis, IN (US); Yunfeng Li, Beijing (CN); Robert M. Steinman, Bowie, MD (US)

(73) Assignee: Purdue Research Foundation, West Lafayette, IN (US)

(*) Notice: Subject to any disclaimer, the term of this patent is extended or adjusted under 35 U.S.C. 154(b) by 1226 days.

(21) Appl. No.: 11/971,898

(22) Filed: Jan. 9, 2008

(65) Prior Publication Data
US 2008/0166065 A1 Jul. 10, 2008

Related U.S. Application Data

(60) Provisional application No. 60/884,083, filed on Jan. 9, 2007.

(51) Int. Cl.
*G06K 9/00* (2006.01)
(52) U.S. Cl. .......... 382/154; 345/419; 382/285
(58) Field of Classification Search ............ 345/419; 382/154, 285
See application file for complete search history.

(56) References Cited

U.S. PATENT DOCUMENTS

| | | | |
|---|---|---|---|
| 4,785,399 A | 11/1988 | Evans et al. | |
| 6,034,691 A | 3/2000 | Aono et al. | |
| 6,094,198 A * | 7/2000 | Shashua | 345/419 |
| 6,099,573 A | 8/2000 | Xavier | |
| 6,201,881 B1 | 3/2001 | Masuda et al. | |
| 6,384,826 B1 | 5/2002 | Bern et al. | |
| 6,504,536 B1 | 1/2003 | Setoguchi | |
| 6,647,146 B1 | 11/2003 | Davison | |
| 6,867,772 B2 | 3/2005 | Kotcheff | |
| 6,897,859 B2 | 5/2005 | Ohta | |
| 6,952,204 B2 | 10/2005 | Baumberg | |
| 6,982,712 B2 | 1/2006 | Ohto | |
| 7,164,789 B2 * | 1/2007 | Chen et al. | 382/154 |

(Continued)

FOREIGN PATENT DOCUMENTS
EP 00196651 A2 8/1986
(Continued)

OTHER PUBLICATIONS

Huang, T.S. and Lee, C.H., Motion and Structure from Orthographic Projections, IEEE Trans. PAMI2, pp. 536-640.

(Continued)

*Primary Examiner* — Gregory M Desire
(74) *Attorney, Agent, or Firm* — John V. Daniluck; Bingham Greenebaum Doll LLP

(57) ABSTRACT

The present disclosure describes a system and method for transforming a two-dimensional image of an object into a three-dimensional representation, or model, that recreates the three-dimensional contour of the object. In one example, three pairs of symmetric points establish an initial relationship between the original image and a virtual image, then additional pairs of symmetric points in the original image are reconstructed. In each pair, a visible point and an occluded point are mapped into 3-space with a single free variable characterizing the mapping for all pairs. A value for the free variable is then selected to maximize compactness of the model, where compactness is defined as a function of the model's volume and its surface area. "Noise" correction derives from enforcing symmetry and selecting best-fitting polyhedra for the model. Alternative embodiments extend this to additional polyhedra, add image segmentation, use perspective, and generalize to asymmetric polyhedra and non-polyhedral objects.

20 Claims, 3 Drawing Sheets

U.S. PATENT DOCUMENTS

| | | | |
|---|---|---|---|
| 7,747,085 B2 * | 6/2010 | Kostrzewski et al. | 382/232 |
| 2005/0041771 A1 * | 2/2005 | Kuo-Petravic et al. | 378/19 |
| 2005/0195185 A1 | 9/2005 | Slabaugh et al. | |
| 2006/0177125 A1 * | 8/2006 | Chan et al. | 382/154 |
| 2008/0166065 A1 * | 7/2008 | Pizlo et al. | 382/285 |
| 2010/0079450 A1 * | 4/2010 | Pizlo et al. | 345/419 |

FOREIGN PATENT DOCUMENTS

| | | |
|---|---|---|
| EP | 01796046 A1 | 6/2007 |

OTHER PUBLICATIONS

Tyler, CW, Human Symmetry Perception and its Computational Analysis, Earlbaum, pp. 349-357, Mahwah, NJ.

Piquer, A., Martin, R.R., and Company, P., Using skewed mirror symmetry for optimisation-based 3D line-drawing recognition, Dept. of Computer Science, Cardiff University, Cardiff, CF24 3XF, UK.

* cited by examiner

RECONSTRUCTION OF SHAPES OF OBJECTS FROM IMAGES

REFERENCE TO RELATED APPLICATIONS

This non-provisional application claims priority to U.S. Provisional Application No. 60/884,083, filed Jan. 9, 2007 with the title "Reconstruction of Shapes of Objects from Images," which is incorporated herein by reference.

FIELD

The present invention relates to processing of digital images. More specifically, the present invention relates to systems and methods for reconstructing three-dimensional object contours from two-dimensional images.

DESCRIPTION

Figure 1:
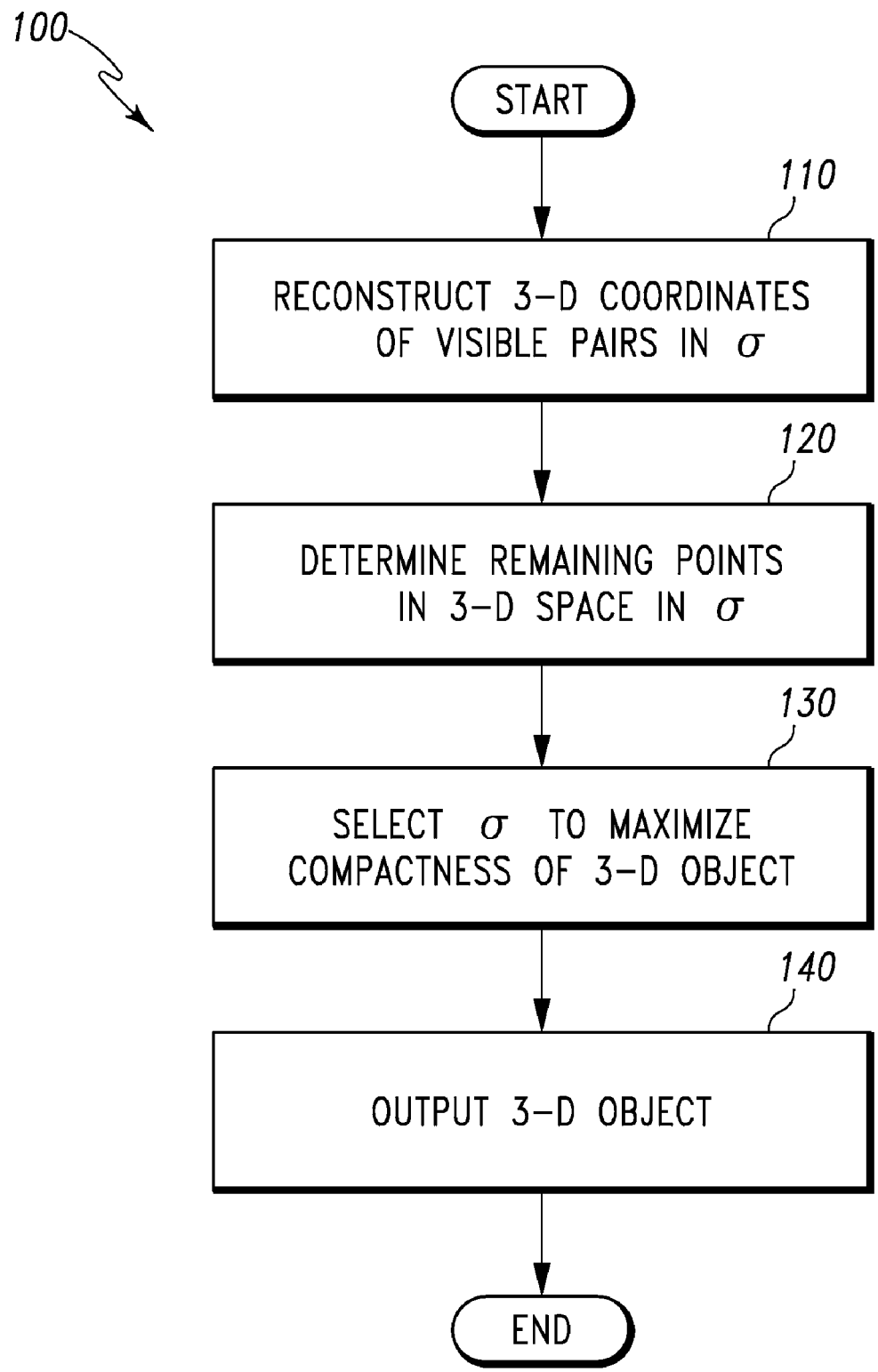
FIG. 1 is a flow chart illustrating reconstruction of a 3-D object based on a 2-D image.

For the purpose of promoting an understanding of the principles of the present invention, reference will now be made to the embodiment illustrated in the drawings and specific language will be used to describe the same. It will, nevertheless, be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates.

One embodiment of this system transforms at least one orthographic image of a symmetric polyhedron into a three-dimensional representation using method 100 as illustrated in FIG. 1. This system assumes that it is known which points in the image correspond to symmetric points in the 3-D object, and also knows which points form contours of faces on the object. Because the objects in images are usually opaque, not all vertices of an object are usually visible. This system uses three pairs of symmetric points that are visible to perform a first step, which establishes a relation between the real image and a virtual image of the object according to the pseudocode below. A virtual image of the 3-D object is created assuming that the object has at least one plane of symmetry.

In a first step 110, 3-D coordinates of visible pairs of symmetric vertices are reconstructed using a method similar to that found in Huang & Lee (Huang, T. & Lee, C. (1989) IEEE Trans. PAMI2, 536-540, the teachings of which are incorporated herein by reference to the extent they do not contradict the teachings herein), where up to one free parameter a represents the stretch along the depth direction. Once these points are reconstructed, the system applies a planarity constraint in step 120 to reconstruct the pairs of points for which one point is invisible (that is, occluded) in the image. The 3-D coordinates of all of these points, both visible and occluded, are determined in up to that one free parameter, σ.

The value of the free parameter a is determined next in step 130 by identifying one or more symmetric polyhedra that collectively fit the full set of points, then maximizing a compactness function as applied to the reconstructed 3-D object.

The compactness function in this embodiment is a function of the volume V of the reconstructed object and its surface area S. In some implementations, the function takes the form $V^m/S^n$, where m<n, such as m=2 and n=3, or m=2 and n=4.8. This type of compactness constraint can be applied to a very wide range of objects, including asymmetric and non-polyhedral objects. It is worth pointing out that the expression $V^m/S^n$ is a result (approximating the product) of two expressions: $V^2/S^3$ and $1/S^3$. Maximizing the former represents maximizing 3D compactness proper. Maximizing the latter represents minimizing the surface area. In some embodiments, the two constraints are combined by using their product. In others, they are used separately.

Finally, at step 140, the method outputs the 3-D object and ends. This output might take any of a variety of forms that will occur to those skilled in the art, but in various embodiments will be an encoding of a list of the reconstructed object's vertices in 3-space, a collection of polyhedra that fit the object, or other data that is useful in a particular application.

Figure 2:
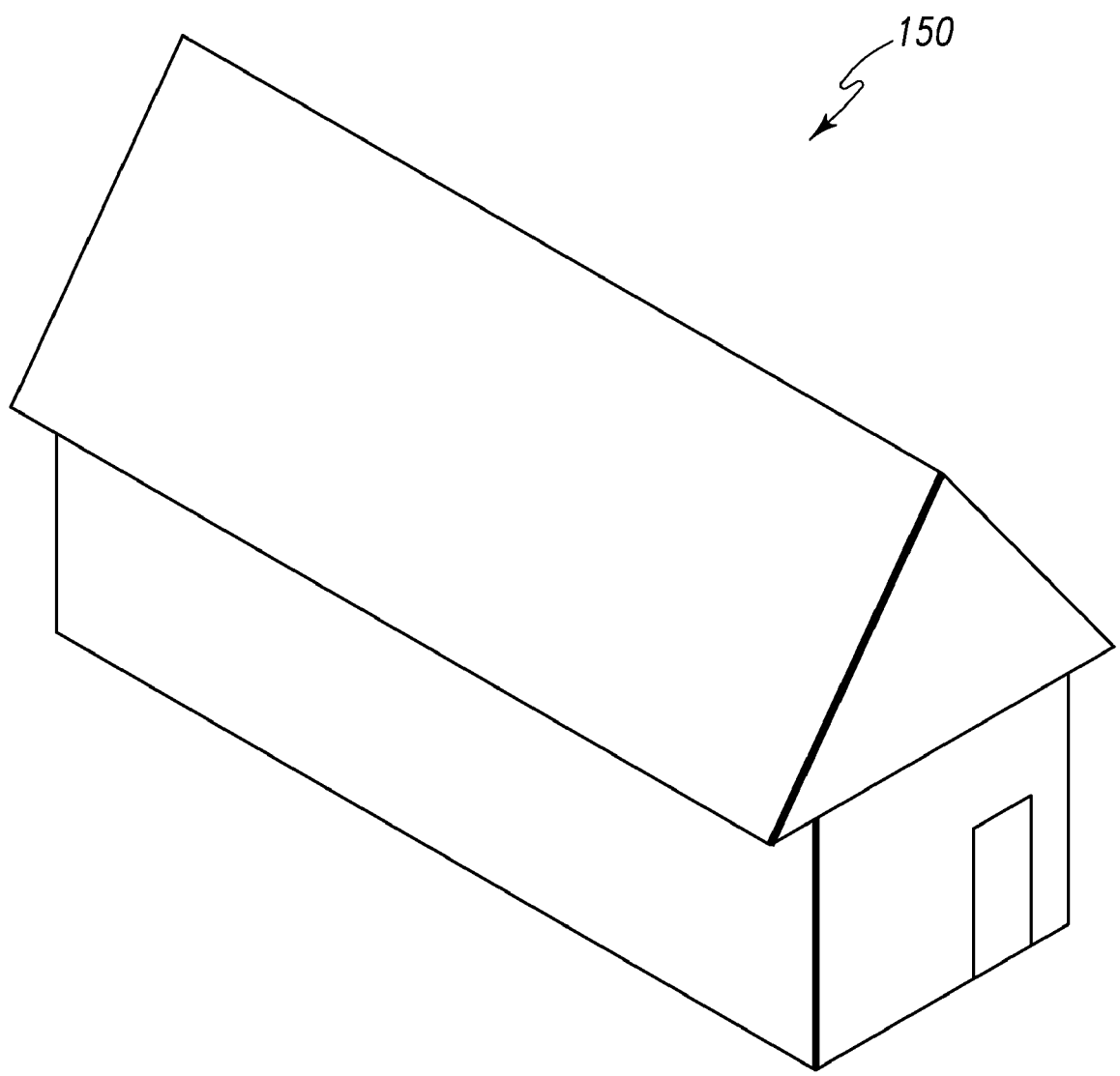
FIG. 2 is a hypothetical 2-D image of a 3-D solid for analysis according to the method illustrated in FIG. 1.
Figure 3:
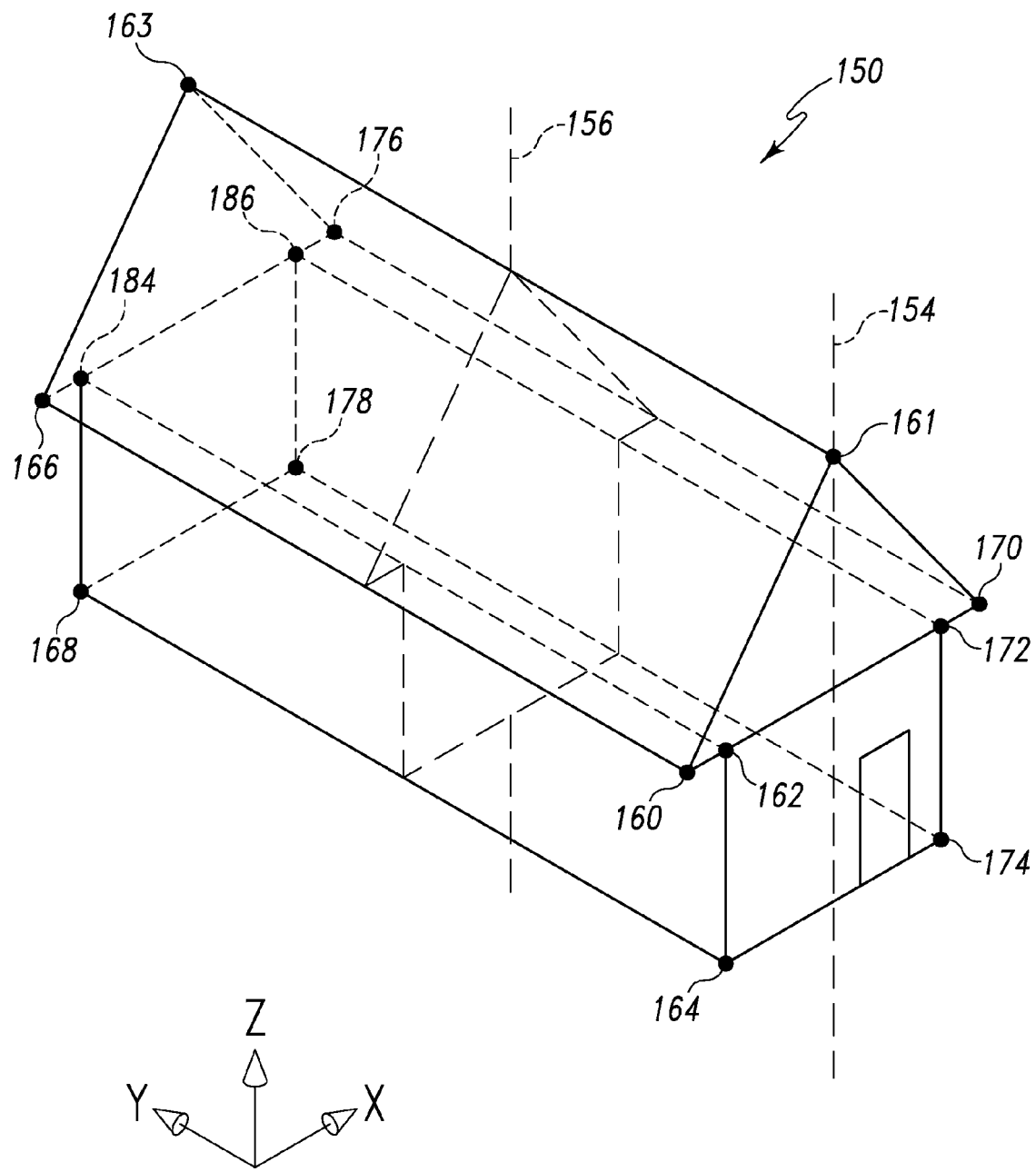
FIG. 3 illustrates identification of vertices of the object in FIG. 2, and symmetric pairs from among them.

Turning to FIGS. 2-3, an exemplary analysis of an image is presented. FIG. 2 illustrates an image of an object (in particular, a house) that has at least one plane of symmetry, wherein at least three pairs of vertices of the object are symmetric about that plane. Object (building) 150 in FIG. 2 is the subject of this exemplary analysis.

FIG. 3 illustrates features of house 150, including the plane of symmetry, several pairs of symmetric data points, and reference axes. First observe that house 150 is symmetric about plane 154, parallel to the yz plane, as well as plane 156, parallel to the xz plane.

Consider the symmetry about plane 156. It can be observed that points 164 and 168, 160 and 166, and 161 and 163 are respectively symmetrically positioned across plane 156 in FIG. 3. These pairs are provided as input to the algorithm described herein. In this embodiment, these three pairs must correspond to points in 3D space that are not all coplanar. In terms of the image points, the midpoints of these three pairs cannot be collinear. The system then calculates the positions of points 176, 178, 184 and 186 as symmetric to points 170, 174, 162 and 172, respectively, about symmetry plane 156. Because the source image has only two dimensions and the modeled object is in three dimensions, all points, visible and hidden, are specified in terms of up to one free variable, referred to herein as "stretch" parameter σ.

When each of the visible and hidden points in the symmetry pairs has been determined (in at most one free variable σ), a value is selected for σ to maximize a compactness metric for the 3-D object (step 130). This selection is made in various embodiments using numerical techniques, linear programming, calculation, or other techniques as will occur to those skilled in the art.

In this embodiment, the compactness metric is selected to be the ratio of the square of the volume V to the cube of the external surface area of the object, i.e., $V^2/S^3$. An alternative metric is $V^2/S^{4.8}$. Other suitable functions vary positively as V increases and negatively as S increases. Still other measures of the compactness of the object will occur to those skilled in the art based on the present disclosure, and may be used in this system without undue experimentation.

In various embodiments, the computations and steps described herein are carried out by programmable logic controllers (PLC's), by general purpose microprocessors, or by application-specific integrated circuits (ASIC's). In any of these variations, one or more memory units are associated with each processor or controller to store data and program information as will occur to those skilled in the art. Such memory devices may comprise one or more distinct units of memory, which include one or more types, such as solid-state electronic memory, magnetic memory, or optical memory, just to name a few.

By way of non-limiting example, the memory can include solid-state electronic Random Access Memory (RAM), Sequentially Accessible Memory (SAM) (such as the First-In, First-Out (FIFO) variety or the Last-In First-Out (LIFO) variety), Programmable Read-Only Memory (PROM), Electrically Programmable Read-Only Memory (EPROM), or Electrically Erasable Programmable Read-Only Memory (EEPROM); an optical disc memory (such as a recordable, rewritable, or read-only DVD or CD-ROM); a magnetically encoded hard drive, floppy disk, tape, or cartridge media; or a combination of these memory types. Also, the memory is volatile, nonvolatile, or a hybrid combination of volatile and nonvolatile varieties.

Simulations show that the system reconstructs the object accurately most of the time. When the reconstruction is not perfect, it is at least consistent with what a human observer perceives when presented with the image that was used as input to the system. In some sense, the system perceives objects the same way that humans do.

It is noted that the use of the object's symmetry in some embodiments of this system provides certain benefits in the processing of noisy images. For example, the assumption of symmetry forces all line segments joining symmetric pairs to be parallel because they are each normal to the plane of symmetry. Pairs of points that are not initially mapped to parallel segments are moved into proper relationship, which effectively corrects for their original "noisy" placement.

Likewise, noise correction is applied in some embodiments when the symmetric points at step 110 are used to compute the family of 3D symmetric objects. At this stage, if the data is found to be noisy, then the computation uses a fitting technique (such as least squares approximation) to find closely fitting points. This technique can be applied when more than three pairs of visible points are present in the image. This fitting effectively corrects for some of the noise that might have been present in the original image.

Variations of this system handle a wider or narrower range of polyhedral objects. Generally, the more complex polyhedra that are considered as the system develops, the more computational power will be required to perform that calculation.

In other variations, the system also includes an image segmentation module that automatically determines the pairs of symmetric points in the object. This allows the system to process real images with less human input and intervention.

Still other variations include using perspective projection instead of orthographic projection, and generalizing the process to asymmetric polyhedra, or to other non-polyhedral objects such as generalized cones. These and other adaptations will occur to those skilled in the art and may be implemented without undue experimentation.

In the case of objects with complex 3-D shapes, compactness in some embodiments is computed using one or more simple circumscribed and/or circumscribing polyhedra as proxies for the object itself. This approach has been successfully tested with such objects as a human body.

One embodiment of this system implements the following pseudocode:

```
/******************************************************
Pseudocode
******************************************************/
// define the data structure
struct SymmetricalPair
{
    double x, y, z;
    double x',y',z';
}
/* body of the code */
// create the virtual view
for(i=0;i<nVisiblePairs;i++)
{
    pVirtual[i].x  = -pReal[i].x';
    pVirtual[i].y  =  pReal[i].y';
    pVirtual[i].x' = -pReal[i].x;
    pVirtual[i].y' =  pReal[i].y;
}
// choose four points which are non-coplanar as reference points
int Ref[4];
// choose Ref[0] point as origin, translate the real and virtual view
for(i=0;i<nPairs;i++)
{
    pTransReal[i] = pReal[i]-pReal[Ref[0]];
    pTransVirtual[i] = pVirtual[i]-pVirtual[Ref[0]];
}
// one-parameter search for the element(3,3) of the rotation matrix
// which maximizes compactness of the reconstructed object
double *pCompactness
for(RotMatrix33=-1;RotMatrix33<=1;RotMatrix33+=step)
{
    // Given the element(3,3) of the rotation matrix, three
    // corresponding points in two views (real view and virtual
    // view) will be enough to decide the rotation matrix.
    // The Matrix is used to rotate the object from the original
    // orientation to the one which projects to get the virtual view.
    Matrix3 RotMat;
    RotMat <- calculate the 3-by-3 rotation matrix
    // calculate the z value of the visible pairs of symmetrical points
    for(i=0;i<nVisiblePairs;i++)
    {
        pRealView[i].z = (pTransVirtual[i].x -
RotMat(1,1)*pTransReal[i].x - RotMat(1,2)*pTransReal[i].y)/
RotMat(1,3);
        pRealView[i].z' = (pTransVirtual[i].x' -
RotMat(1,1)*pTransReal[i].x' - RotMat(1,2)*pTransReal[i].y')/
RotMat(1,3);
    }
    // calculate the z value for those points whose symmetric
    counterparts
    // are invisible.
    // For transparent objects, this step is skipped since all the points
    // are visible.
    While(Not all points are reconstructed)
    {
        Boolean bReconstruction = FALSE;
        for(i=0;i<nInvisiblePairs;i++)
        {
            for(j=0;j<nFaces;j++)
            {
                If( one point(p) of the pair(i) is on face (j) &&
    At least three points on face (j) have been constructed)
                {
                    // p is on the plane determined by the three
                    // reconstructed points
                    pRealView[i].z <- get the z value of visible
                    point
                    // According to the symmetry, reconstruct the
                    // hidden point
                    pRealView[i].x'
                    pRealView[i].y'
                    pRealView[i].z'
                    bReconstruction = TRUE;
                }
            }
        }
```

-continued

```
        if(bReconstruction == FALSE) // reconstruction failed
            return;
    }
    // calculate the compactness of this object
    pCompactness[index] <- (volume^2)/(area^3);
}
// choose the one with the maximum compactness the reconstructed object
```

Other implementations will occur to those skilled in the art. The disclosure of Vetter, T. & Poggio, T. (2002) in: Human Symmetry Perception and its Computational Analysis. C W Tyler (Ed.), Mahwah, N.J.: Earlbaum (pages 349-359) is incorporated herein by reference to the extent it does not contradict the teachings herein.

While the invention has been illustrated and described in detail in the drawings and the foregoing description, the same is to be considered as illustrative and not restrictive in character, it being understood that only one or more preferred embodiments have been shown and described and that all changes and modifications that come within the spirit of the invention are desired to be protected.

What is claimed is:

1. A system, comprising a processor and a memory in communication with the processor, the memory storing programming instructions executable by the processor to:
    accept input of a two-dimensional image of a 3-D object that is symmetric about a plane, the 3-D object having a surface;
    accept input of three pairs of points, each pair being visible in the image, on the surface of the object, and symmetric about the plane;
    these three pairs of points are not all coplanar in the 3D model;
    create a model of the object by
        reconstructing coordinates in 3-space for each point in the three pairs of points in terms of exactly one free parameter;
        determining coordinates in 3-space of at least one additional pair of symmetric points on the surface of the object, wherein
            each additional pair includes at least one point that is visible in the image, and
            each additional pair is specified in terms of the free parameter; and
        selecting a value for the free parameter that at least approximately maximizes a compactness metric as applied to the reconstructed object in 3-space; and
    provide output that encodes the model.

2. The system of claim 1, wherein the compactness metric is a function of the one free parameter representing the stretch of the model in the dimension that is being reconstructed from the image.

3. The system of claim 1, wherein the compactness metric is the ratio of the volume of the model raised to power m, to the surface area of the model raised to power n ($V^m/S^n$), where $m<n$.

4. The system of claim 3, wherein $m=2$, and $n=4.8$.

5. The system of claim 1, wherein the compactness metric is a function of the surface area of the model.

6. The system of claim 1, wherein the selected value for the free parameter exactly maximizes the compactness metric as applied to the model.

7. The system of claim 1, wherein the programming instructions are further executable by the processor to perform image segmentation on the input image to automatically detect vertices to serve as the three pairs of points.

8. The system of claim 1, wherein the compactness metric is a function of the ratio of
    the total volume raised to power m, of one or more regular polyhedra that collectively circumscribe the object to
    the total surface area raised to power n, of the one or more regular polyhedra,
    where $m<n$.

9. The system of claim 8, wherein $m=2$, and $n=4.8$.

10. The system of claim 1, wherein the selecting function comprises generating the model from polyhedra, including selecting a best-fit polyhedron using a fit optimization method.

11. A method of extracting three-dimensional structure of an object from a two-dimensional image of the object, where the object is symmetric about a plane, comprising:
    creating a model of the object in 3-space by
        automatically reconstructing coordinates in 3-space for each point in three pairs of symmetric points in terms of exactly one free parameter;
        automatically determining coordinates in 3-space of at least one additional pair of symmetric points on the surface of the object, wherein
            each additional pair includes at least one point that is visible in the image, and
            each additional pair is specified in terms of the free parameter; and
        automatically selecting a value for the free parameter that at least approximately maximizes a compactness metric as applied to the model; and
    generating an output signal that encodes the model.

12. The system of claim 11, wherein the compactness metric is the ratio of the square of the volume of the model to a power of the surface area of the model, where the power is greater than two.

13. The system of claim 11, wherein the compactness metric is a function that varies inversely with the surface area of the model.

14. The system of claim 11, wherein the selected value for the free parameter exactly maximizes the compactness metric as applied to the model.

15. The system of claim 11, wherein the programming instructions are further executable by the processor to perform image segmentation on the input image to automatically detect vertices to serve as the three pairs of points.

16. The system of claim 11, wherein the compactness metric is a function of the ratio of
    the square of the total volume of one or more regular polyhedra that collectively circumscribe the object to
    a power of the total surface area of the one or more regular polyhedra,
    where the power is greater than two.

17. The system of claim 11, wherein the selecting function comprises generating the model from polyhedra, including selecting a best-fit polyhedron using a fit optimization method.

18. The system of claim 11, wherein the automatically selecting step comprises generating the model from polyhedra, including selecting a best-fit polyhedron using a fit optimization method.

19. A system for producing a three-dimensional model of an object from a two-dimensional image, comprising a processor and a memory, the memory storing programming instructions executable by the processor to:
    accept input of a two-dimensional image of a 3-D object that is symmetric about a plane, the 3-D object having a surface;

accept input of one or more pairs of points, each pair being visible in the image, on the surface of the object, and symmetric about the plane;

create a model of the object by reconstructing coordinates in 3-space for each point in the one or more pairs of points;

determining coordinates in 3-space of at least one additional pair of symmetric points on the surface of the object, wherein each additional pair includes at least one point that is visible in the image; and moving a point from the one or more pairs or from the at least one additional pair of points to enforce symmetry about the plane; and output a signal that encodes the model.

20. The system of claim 19, wherein the programming instructions are further executable by the processor to perform image segmentation on the input image to automatically detect vertices to serve as the one or more pairs of points.

* * * * *